Patented Feb. 16, 1954

2,669,556

UNITED STATES PATENT OFFICE 2,669,556

PROCESS FOR PREPARING BIS-(AMINO ARYL) METHANE POLYAMIDES

Carleton A. Sperati, Wilmington, Del., assignor to E. I. du Pont de Nemours and Company, Wilmington, Del., a corporation of Delaware No Drawing. Application February 24, 1953, Serial No. 338,597

6 Claims. (Cl. 260—78)

1

This invention relates to a novel process for making a class of polyamide resins, namely, those which the amine component is a bis-(amino aryl)-methane.

Heretofore it was known that polyamides could be obtained by reaction between bis-(amino aryl) methanes and diphenyl esters of alkanedioic acids. It was well known also that other diamines would undergo reaction with dicarboxylic acids to form salts which by the action of heat could be converted to a polyamide. When attempts were made to apply this latter process to bis-(amino aryl) methanes, serious difficulties were encountered, and for reasons not then understood the process was accompanied by gelation, which indicated that excessive cross-linking in the polymeric molecule was occurring.

At first it was suspected that the gelation reaction might be caused by the presence of traces of impurities in the diamine reactant, because it was recognized that a small amount of a triamine component could set up reactive centers along the polyamide chain, and it was believed that this ultimately could result in branching and the production of a molecular network of cross-linked chains of the kind believed to be formed during a gelation reaction. This hypothesis, however, was not very well supported by the facts, because even when an extremely pure sample of a bis(p-amino aryl) methane was tried, gelation was observed in exactly the same fashion as had been noted with earlier samples of bis-(p-amino aryl) methanes.

An object of this invention was to provide a method for suppressing gelation in the manufacture of polyamides from bis-(amino aryl)-methanes and alkanedioic acids.

It has been discovered, in accordance with this invention, that if litharge is present in a controlled small quantity (0.01% to 2.0% based on the weight of the total polyamide ingredients) during the polyamide-forming reaction between bis-(p-amino aryl) methanes and alkanedioic acids, gelation of the reaction mixture is suppressed.

While I do not wish to be bound by any theory, I believe that there are certain plausible explanations which appear to make the invention more readily understandable. It is entirely possible that in the absence of litharge but in the presence of the acidic ingredients or catalysts which are employed in making polyamides, bis-(p-amino aryl) methanes can undergo a molecular transformation of a triamine, which as explained above, would cause gelation. This could occur as follows:

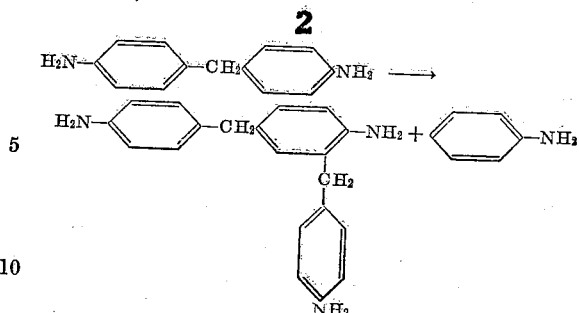

The function of the litharge appears to be to speed up the polyamide-forming reaction while at the same time effectively neutralizing the acids that catalyze the triamine-forming reaction, so that as a result, the race between these competing reactions is resolved so overwhelmingly in favor of polymer-formation from the diamine and acid reactant that triamine formation is virtually completely suppressed, and gelation is inhibited.

While the theory just presented is believed to be a plausible one, it should not be regarded as having a limiting effect upon the invention. In fact, the invention is not based on any particular theory, but rather on the discovery that in a process for preparing polyamides from alkanedioic acids and diamines of the formula

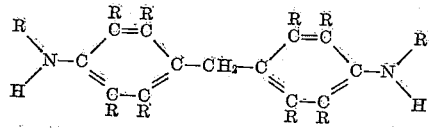

wherein R is from the class consisting of H—, and alkyl groups having from 1 to 3 carbon atoms, gelation can be suppressed by interacting equimolal quantities of these ingredients in the presence of 0.01 to 2.0% of litharge, based on the weight of these reactants, and heating the resulting mixture in the molten state at a polyamide-forming temperature, e. g. 250° to 300° C. until an ungelled polyamide is produced. The final heating is preferably carried out at diminished pressure to effect removal of the volatile products of the condensation-polymerization reaction, thereby promoting production of a high viscosity polyamide. The pressure may be judiciously lowered during the various stages of heating to avoid excessive foaming, if optimum results are desired. In this way polyamides having an inherent viscosity (measured at 0.5% conc. in m-cresol) of about 1.0 are very readily obtained, and somewhat higher inherent viscosities also have been produced from these ingredients in this manner.

The invention is illustrated further by means of the following examples.

Example I

A mixture consisting of equimolar amounts of sebacic acid and bis-(p-amino-o-tolyl) methane was admixed with 0.1% of its weight of litharge, and heated for 1.5 hours under atmospheric pressure at a temperature of 210° C. Thereupon the temperature was increased to 277° C. and the heating was continued for an additional hour at atmospheric pressure, and finally at the same temperature (277° C.) for three additional hours at a pressure of slightly below 1 mm. The inherent viscosity of the polymer (measured at 0.5% conc. in m-cresol) just before final lowering of the pressure was 0.29, but after the final low pressure heating was 0.70. There was virtually no gelation of the polymer during this run. In a parallel experiment the same steps were carried out except that no litharge and no other catalyst was added. There was no significant difference in the inherent viscosity of the polymer until the final heating stage. After the final heating, however, the mixture gelled and virtually no soluble high viscosity polymer was obtained.

Example II

The experiment described in Example I was repeated except that 1.0% of litharge was used, and the heating schedule was as follows: 1.2 hours, 210° C., atmospheric pressure, followed by 0.4 hour, 277° C., atmospheric pressure, followed by 0.8 hour, 277° C., 30 mm., and finally 2.0 hours, 277° C., ca. 1 mm. The inherent viscosity after the final heating was 0.87 and no gelation was observed.

Example III

Example II was repeated with similar results, using bis-(N-ethyl-p-amino phenyl) methane in place of bis-(p-amino-o-tolyl) methane.

Example IV

Example II was repeated with similar results, using bis(4-amino-2,3,5,6-tetramethyl phenyl)-methane in place of bis-(p-amino-o-tolyl) methane.

Example V

A mixture consisting of equimolal amounts of sebacic acid and bis-(p-aminophenyl) methane was admixed with 1% by weight of litharge, and heated for 20 minutes at 210° to 215° C. under atmospheric pressure until a small amount of solid phase began to form. The temperature was then increased to 277° C. and the heating was continued under atmospheric pressure for about 40 minutes more, until evolution of steam ceased. Thereupon the pressure was lowered to 30 mm., and heating continued for 20 minutes at 277° C. Finally the pressure was lowered to 0.4 mm., and the heating was continued for 30 minutes at 277° C. The polyamide thus obtained had an inherent viscosity of 1.0, and a density of 1.14. The opaque crystalline polymer is obtained by slowly cooling the polymer melt; amorphous polymer is clear and is formed by quenching the melt. The crystalline form can be converted to the opaque form by heating for 20 minutes at 150° C. A parallel experiment, carried out in the absence of litharge gave only a gelled polymer.

While the foregoing examples illustrate the process of the invention as applied to the manufacture of polysebacamides, it is to be understood that the process yields other polyalkanedioic amides depending upon the alkanedioic acid used. Polyglutaramides, polysuberamides, etc., can all be made in the same manner by using the appropriate alkanedioic acid. Moreover copolymers are readily obtainable by the process hereinabove illustrated, since either the diamine component or the acid component, or both, may include multiple species.

The products obtained by this process are highly useful, and exhibit numerous valuable properties. Where stiffness at elevated temperatures is desired (for bearings, gaskets, washers, etc. operating at 50°–100° C.), these products have advantages over the more common polyamides such as polyhexamethylene adipamide.

I claim:

1. A process for preparing polyamide resins from alkanedioic acids and diamines of the formula

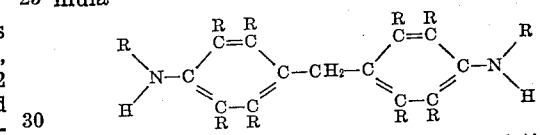

wherein R is a member of the class consisting of H-, and alkyl groups having from 1 to 3 carbon atoms, which comprises interacting equimolar quantities of these reactants in the presence of a catalytic quantity of litharge, and heating the resulting mixture in the molten stage until an ungelled polyamide is produced.

2. A process for preparing polyamide resins from diamines of the formula

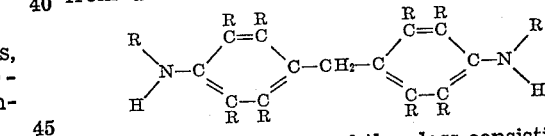

wherein R is a member of the class consisting of H-, and alkyl groups having from 1 to 3 carbon atoms and alkanedioic acids which comprises interacting equimolar quantities of these reactants in the presence of from 0.1 to 1.0% by weight litharge, and heating the resulting mixture in the molten state until an ungelled polyamide is produced.

3. Process of claim 2 wherein the diamine is bis-(p-aminophenyl) methane.

4. Process of claim 2 wherein the diamine is bis(p-amino-o-tolyl) methane.

5. Process of claim 2 wherein the diamine is bis-(N-ethyl-p-amino phenyl) methane.

6. Process of claim 2 wherein the diamine is bis-(4-amino-2,3,5,6 - tetramethyl phenyl) methane.

CARLETON A. SPERATI.

No references cited.